United States Patent [19]
Redlich

[11] Patent Number: 5,877,748
[45] Date of Patent: Mar. 2, 1999

[54] COMPUTER CONTROL INPUT INTERFACE SYSTEM

[76] Inventor: Sanford I. Redlich, 16205 SE. Martin St., Portland, Oreg. 97236

[21] Appl. No.: 561,035

[22] Filed: Nov. 20, 1995

[51] Int. Cl.[6] .................................................. G09G 5/08
[52] U.S. Cl. ........................................... 345/163; 345/159
[58] Field of Search ..................... 395/159, 160, 395/157, 163, 167, 145

[56] References Cited

U.S. PATENT DOCUMENTS

| | | | |
|---|---|---|---|
| 4,587,510 | 5/1986 | Kim | 338/128 |
| 5,119,077 | 6/1992 | Giorgio | 340/710 |
| 5,162,781 | 11/1992 | Cambridge | 340/710 |
| 5,164,713 | 11/1992 | Bain | 340/710 |
| 5,191,641 | 3/1993 | Yamamoto et al. | 395/118 |
| 5,298,890 | 3/1994 | Kanamaru et al. | 345/157 |
| 5,305,449 | 4/1994 | Ulenas | 395/500 |
| 5,376,946 | 12/1994 | Mikan | 345/159 |

OTHER PUBLICATIONS

"Master Any Game You Choose," *Multimedia World*, Nov. 1995, pp. 115–116, 119–122, 125, 128.

*Primary Examiner*—Xiao Wu
*Attorney, Agent, or Firm*—Marger Johnson & McCollom, P.C.

[57] ABSTRACT

A method of controlling a cursor or other visible object on a display screen responsive to manipulation of a mouse or other input device includes defining a continuous-motion zone, and moving the visible object substantially continuously on the display screen while the input device indicates a position in the continuous-motion zone. Optionally, the object is held fast on the screen while the input device indicates positions within a predetermined null zone to avoid drift. Intermediate the null zone and the continuous-motion zone, the cursor is repositioned on the screen as in response to a conventional mouse.

18 Claims, 7 Drawing Sheets

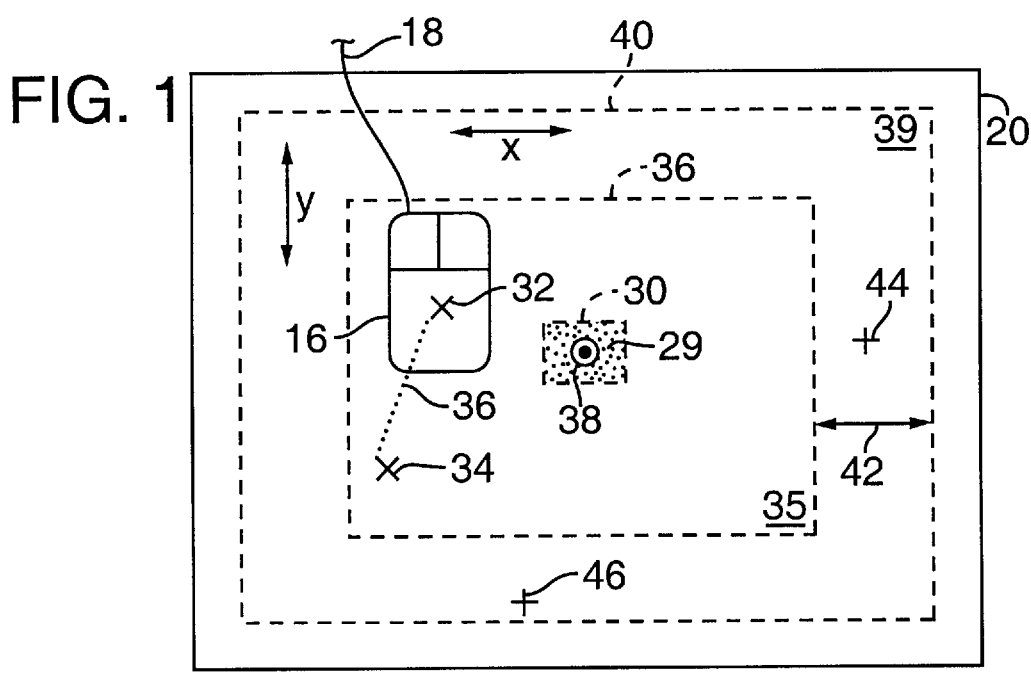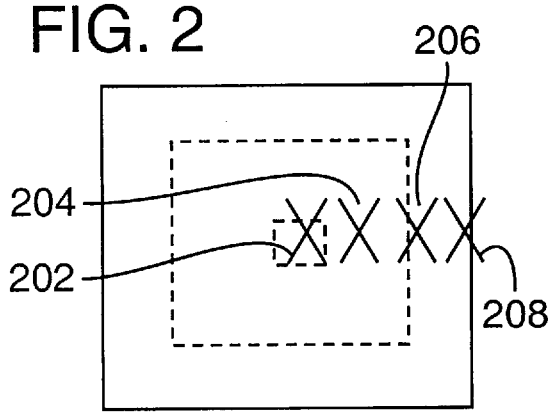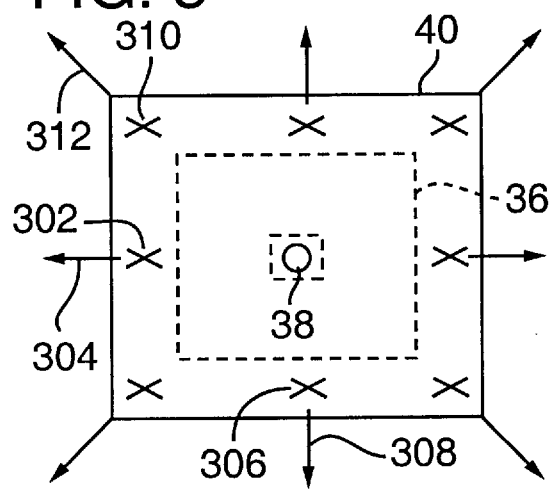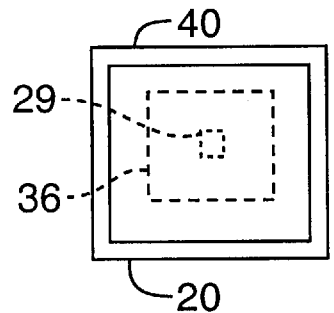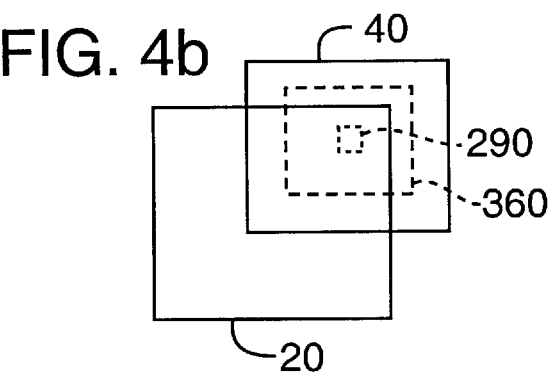

COMPUTER CONTROL INPUT INTERFACE SYSTEM

FIELD OF THE INVENTION

The present invention relates to the control of a computer cursor, on-screen object or viewpoint via manually actuated input devices such as the ubiquitous computer "mouse". More particularly, it refers to a novel, software-implemented methodology that provides the advantages of both a computer mouse and a computer joystick without requiring hardware modification.

BACKGROUND OF THE INVENTION

As computers become more powerful, the interfaces that typical programs present to users have become increasingly graphical. In order to let users select and manipulate objects in these graphical worlds, or to allow users to shift the viewpoint presented on-screen, many non-keyboard computer input devices have been created. Two of the most popular of these devices are the computer mouse and the computer joystick. A typical mouse and its method of operation are described in U.S. Pat. No. Re. 32,632 incorporated herein by this reference. The mouse is an example of a displacement or spacial mapping type of input device. Another example is the trackball. The mouse has become the most popular controller for computer programs other than video games. For video games, the joystick is the most popular device. The reason for these separate domains is simple. Identifying particular screen locations (or areas) is the primary non-keyboard input required for most programs that are not video games, e.g. word processors. For quickly and precisely indicating a position on a 2D surface, the mouse is a superior device to any form of joystick, but the mouse is inferior for indicating a constant direction of motion. The joystick, on the other hand, is poorer for indicating specific positions, but it can indicate a desired direction of movement indefinitely. The mouse's superiority for position selection is conferred by the fact that the mouse's working surface is a spatial map of what's on the monitor, so the user can almost instantly indicate any point. The mouse's problem with continuous indication of direction is the same, it is spatially mapped. Thus, in order to move an on-screen object continuously in a selected direction, one must repeatedly readjust the relationship between the mouse's position on its working surface (e.g. a mouse pad) and the on-screen object. That is, one must lift the mouse up, decoupling it from cursor movement and put it down in a different place. Continuous movement in one direction requires that this maneuver be performed repeatedly.

The joystick's superiority for direction indication derives from its basic design. When the user puts pressure on the joystick sensors, that indicates that motion is desired in the given direction. The motion will be sustained until the user releases pressure on the sensors. However, in order to indicate a particular point, the joystick user must push precisely in the direction of the desired point. Then the user must release the joystick at the exact instant that the on-screen object, such as a cursor, is in the desired position. This procedure is more difficult and less precise than mouse usage because humans are better at working with spatial mappings than with acceleration mappings.

The Computer Mouse

Thus, a major problem with the computer mouse is that this relative mouse-reference object (e.g. a cursor) readjustment must be done frequently. The lifting and dropping procedure also is thought to contribute to repetitive strain injuries. It is undesirable for game players because the player loses control of the game for $\frac{1}{16}$th to $\frac{1}{4}$th of a second each time the maneuver is performed. One can adjust the mouse tracking so that very slight mouse motions cause great cursor motions. Simply making the mouse pad map to a larger screen area is helpful if the task is limited to a single screen, but it makes fine operations like highlighting two letters of a word extremely difficult—the human hand isn't that precise—and makes typical operations uncomfortably demanding on hand precision. Further, it still does not allow unlimited motion in a given direction, as may be needed, for example, for a video game.

Hand mouse hardware developers have tried to solve this problem by creating a mouse pad with barriers on the edges that sense contact with the mouse and continue cursor movement so long as the mouse contacts the barrier (see Bain, U.S. Pat. No. 5,164,713). The disadvantage of this approach is that special hardware is required, the special hardware takes up considerable desk space, the computer mouse must be pushed against the barriers even though this may be uncomfortable, and dimensions of input other than the standard two are not accommodated. Hand mouse software developers have also tried to ameliorate this problem via non-linear acceleration curves. For example, see U.S. Pat. No. 5,191,641 to Yamamoto et al. An acceleration curve works by making slow mouse movement translate into relatively little cursor motion while fast mouse movement is translated into relatively great cursor motion. Thus, if a mouse is moved a given physical distance, a slow transit will result in little cursor motion and a fast transit will result in greater cursor motion. This is a useful idea, but the acceleration curve distorts the spatial mapping, which lowers the user's precision in cursor positioning. This occurs because the less linear the acceleration curve becomes, the less spatial and the more accelerative becomes the mapping between mouse motion and cursor motion. That is, the use of the acceleration curve yields many of the problems of a joystick, and only allows more of the screen to be mapped to a given working surface size while preserving a given capacity for fine motion control. Acceleration curves do not solve the Continuous-motion problem. To effectively play many video games, the user must register movement in a single direction (e.g. having an on-screen character run down a long hallway) for unlimited periods.

The Computer Joystick

Joysticks of all kinds, including devices like Home Row's "J" key, IBM's Trackpoint II, or Interlink's Supermouse, do not have any Continuous-motion problem. Activate the appropriate sensor and the cursor will move in the indicated direction indefinitely. For example, see U.S. Pat. No. 5,231,386 to Brandenburg et al. disclosing a keyswitch integrated pointing device. A more conventional computer joystick is shown in U.S. Pat. No. 4,587,510 to Kim. These are "acceleration mapped" rather than "spatially mapped" control systems. They measure applied force rather than traversed distance. This property is useful for applications where the joystick controls something in a simulation that, in the real world, would be an acceleration-mapped device (e.g. the body of a tank). That is, a mouse is a good device to specify a point on the horizon to shoot at, but it is awkward for steadily moving the tank forward. Conversely, a joystick is a good device to move the tank forward, but it is a slow and imprecise way to specify a target position at which to shoot.

The ideal system, for game playing and even office work, would combine the best of both worlds. The ideal system would allow fast, precise target selection, but allow Continuous-motion when that was required. Further, the ideal solution would improve the mouse rather than the joystick because the mouse is by far the more common device, sold with nearly all computers.

It is therefore an object of the present invention to provide a computer control that features the speed and precision of a conventional computer mouse, together with the Continuous-motion capabilities of a computer joystick. A further object of the invention is to provide these capabilities without hardware modification of a standard computer system such as a personal computer having a conventional mouse system.

U.S. Pat. No. 5,164,713 to Bain is directed to a "Cursor Position Controller for Use with Mouse and Display Systems". This reference discloses a cursor-positioning apparatus for use with a conventional mouse. Referring to FIGS. 1 and 2, the mouse sits on a controller unit 10 which includes a flat surface for normal mouse operation bounded by a raised lip or wall that confines the operational area of the mouse. Referring to the Specification at Column 4, lines 11 et seq., the inside surface of the walls include sensors for detecting contact of the mouse. When the mouse contacts any of the sensors, the system generates repetitive cursor movement signals which cause the cursor to continue movement in the corresponding orthogonal direction on a display screen, as long as the mouse is held in contact against the wall. Orthogonal directions +X, -X, +Y and -Y are resolved by four respective sensors. As long as the mouse is pressed against one of the sidewalls, the cursor moves at a constant speed. See Column 4, lines 58–65 and Column 6, lines 4–10. As noted, this system is not practical because it requires extra special purpose hardware apparatus. Additionally, it is limited in that it can only resolve XY orthogonal directions in the "course positioning" mode. Not only is it limited to moving the cursor in orthogonal X and Y directions, it is also limited to moving the cursor at a constant speed.

U.S. Pat. No. 5,298,890 to Kanamaru et al. is directed to a "Discontinuous Movement System and Method for Mouse Cursor." This patent recognizes the same problems as those summarized above, i.e., that the size of a typical mouse pad or operating area is smaller than the size of the corresponding computer display screen. This invention seeks to reduce the necessary travel of the mouse pointing device itself while allowing the cursor to traverse relatively long distances over the display screen. Referring to FIG. 4 of the patent, three windows (numbered window 1–window 3) and 5 icons (numbered icon 1 through icon 5) are shown on a display screen. According to the invention, when the mouse is moved, the system identifies the window in which the mouse presently is located; identifies a second window (or icon or other designated area of the screen) that lies in the path of the mouse, based on its current direction of travel, and; thirdly, determines whether or not the second window is spaced apart from the first window. In other words, the system determines whether there is blank space on the screen between the first window and the second window. The second window apparently is presumed to be the intended destination of the cursor. In such a case, when the cursor position reaches the border of the first window, the cursor is repositioned so that it "jumps" to the second window, as illustrated by the dashed line (A) in FIG. 4. If the first and second windows are overlapping, as are window 1 and window 2, no such jump is necessary. Accordingly, continuous movement of the cursor is effected as indicated dashed line (B) in the Figure. U.S. Pat. No. 5,119,077 to Giorgio is directed to "Interactive Ballistic Tracking Apparatus". This patent discloses a computer mouse that allows an operator to interactively adjust horizontal and vertical resolution or tracking without using the keyboard. Essentially, holding down both (or all) of the mouse buttons and moving the mouse over a surface disables the output to the computer and instead is used to modify the tracking of the mouse. A speaker, LEDs or other means are used to provide an indication to the user of the current gain setting of the mouse. The invention claims to obviate the need for memory resident dynamic tracking program. The problem with this approach is that however the tracking or resolution may be set, it is fixed until it is explicitly reset. It is cumbersome and time consuming for a user to have to reset the mouse for example to fine resolution whenever fine tracking is necessary, and then stop her work to reset the mouse to coarser resolution when a faster mouse action is desired. The need remains, therefore, for a computer input system that provides both the high resolution of a conventional computer mouse for finer work, and coarser action of a conventional joystick without interrupting the user's activities to reconfigure the input device.

The Head Mounted Display with Motion Detectors

The problems discussed above are not unique to the computer mouse, but are common to all computer spatial-movement input devices that send to the computer the relative motion of the device and the world. Another example of such a device is a head-mounted display ("HMD") that incorporates motion detectors. The HMD presents the user with view screens mounted in front of the user's eyes. When used in conjunction with software that simulates a view of a three dimensional world, the user can feel immersed in an artificial reality. To add to this simulation of reality, HMD's often incorporate motion detectors, so that when the user's head turns, the generated view can be shifted to simulate a changing viewpoint in a three dimensional world. Thus the HMD provides input signals indicative of angular rotation in at least one dimension. One problem with this system is that the user is often seated, but would like to turn 360 degrees in the virtual world. With standard HMD detectors like those on Virtual I/O's "virtual i-glasses", a seated user can comfortably turn through less than 180 degrees, both side-to-side and up-and-down, which can be quite frustrating when playing video games, etc. Further, current HMD's suffer from the fact that the sensors are not perfectly accurate. After repeated movements, a return to the starting position will not necessarily yield the same visual scene as before the movements. That is, after some use, the HMD orientation and the view presented to the wearer are not in their proper relationship. Using existing technology, this problem must be corrected by using another input device to readjust the HMD-view relationship.

SUMMARY OF THE INVENTION

A mouse is used most effectively within a defined frame of comfortable use, or "Comfort Frame," a region within which it does not require mouse-cursor readjustment. In other words, the Comfort Frame is a region within which a particular user can comfortably and accurately manipulate a particular mouse (without lifting the mouse off the work surface). Within the Comfort Frame, the mouse provides fast and precise pointing control.

In order to achieve the objects of the invention and overcome the problems of the prior art, the software approach described herein allows a mouse to function as a spatially-mapped mouse within the user's frame of comfortable use, but allows it to function as a joystick near the edge of the frame of comfortable use (hereinafter referred to as the "Comfort Frame"). This simple software solution allows the user to set the size of their Comfort Frame by asking them to move their mouse from the upper left corner of their comfortable working surface to the lower right corner. If they were using a mouse pad, for example, the entire mouse pad surface could be used as the Comfort Frame.

Within the Comfort Frame, there are three special regions, differentiated by different behaviors: the No-Motion Zone (which is optional), the Normal zone, and the Continuous-Motion Zone. From the Comfort Frame's center, the Zones are arranged in concentric regions (which may be any shape; rectangular is depicted for illustration), the No-Motion Zone is the innermost, then the Normal zone, then the Continuous-motion Zone at the Comfort Frame edge (see FIG. 1). When the mouse is within the No Motion Zone, motion of the mouse is registered by the driver software, but screen objects are unaffected by this motion (see FIG. 2). This region is primarily for video games, where the user may want a safety region so that no unintended movement affects gameplay. When the mouse leaves the No Motion Zone, it enters the Normal zone, where mouse movement is handled in the way conventional mouse drivers interpret mouse motion. When the mouse moves outward from the Normal zone, it enters the Continuous-motion Zone. In the Continuous-motion Zone, mouse movement is still processed as in the Normal zone, but additional motion is steadily added. In one embodiment, the additional motion is added in a vector that the mouse's current position makes with the Comfort Frame's center (see FIG. 9). Video games or virtual reality applications can require the user to be able to move fluidly in any direction, at any time. For such applications, it may be useful for the motion added in the Continuous-motion Zone to be added along a line defined between the mouse's current position in the Comfort Frame and the Comfort Frame's center, as will be described with reference to FIG. 9.

This additional motion is not necessarily added uniformly across the Continuous Motion Zone. An acceleration curve may be specified across the Continuous Motion Zone, so that a small amount of extra motion is added near the Normal Zone border and a great amount is added near the Comfort Frame (see Table 1).

One limitation of the above system arises from the fact that a mouse is not a perfect position sensor. The mouse will slightly misreport its motion across the mouse pad, causing the software's representation of the Comfort Frame's center to diverge from that of the physical working surface. To correct this "drift" or to compensate for the user having changed working surfaces (e.g., if they move to use another part of their desk), the software must be able to re-center the Comfort Frame on the working surface. This is implemented very simply: when the mouse passes the edge of the Comfort Frame, the Comfort Frame is dragged with the mouse. In the example of FIG. 4, eventually the user will want to use joystick mode in the downward or left direction. The user will naturally move the mouse to the extreme of their frame of comfort in that direction, which will be beyond the "drifted" Comfort Frame of FIG. 4 (2), dragging the frame back toward the centered position of FIG. 4 (1). This will keep the Comfort Frame centered on the user's center of comfortable physical motion. In practice the user will be continually re-centering the Comfort Frame on the working surface in the course of normal use. The user may also press a key that will re-center the Comfort Frame around the mouse's current position. This means that the Comfort Frame will not always line up with the working surface properly. To help people know where the Comfort Frame is, and control the amount of added motion, the software can optionally provide steady feedback to indicate when the mouse is in the Continuous-motion Zone. This feedback can be either by a flashing light at a corner of the display, audible signals, flashing a light on the keyboard, etc. The rate of such signaling corresponds to the amount of motion added to the normal mouse motion, so slight Continuous-motion Zone additions result in low frequency feedback, whereas large Continuous-motion Zone additions result in higher frequency feedback.

The present invention is not limited in application to a conventional mouse. Nor is it limited to x-y motion on a display screen. For example, others have described computer mice capable of more than two dimensions of spatial information input. Another important dimension is angular rotation (see Cambridge U.S. Pat. No. 5,162,781). These devices have the limitation that it may be convenient for the user to turn an on-screen object or viewpoint 360 degrees or more, but the mouse itself can only be comfortably rotated within a small angle (see FIG. 5). The present invention can easily be applied to this problem. To simplify the approach so that it may be applied to any dimension of input, one may consider one dimension at a time. The mouse's orientation, at any angle of rotation, may be mapped to some part of the line seen in FIG. 6. The algorithm for this general case is handled in terms of the thresholds of FIG. 6, and is detailed in the drawing. By adjusting the thresholds of the Comfort Frame, Continuous-motion Zone and No Motion Zone, the behavior of the software with respect to this dimension of input can be widely varied. Rotation, for example, must be sent as a value from the mouse to the computer. This rotational value, whatever its units, can be mapped to a line like that in FIG. 6. The Comfort Frame thresholds can be set by having the user rotate the input device through an angle that is comfortable for them. Then, when the user nears the amount of rotation that is comfortable for them, they will be in the Continuous-motion Zone, and, without the user moving the mouse further, the on-screen object or viewpoint will rotate indefinitely. Any dimension of input may be mapped this way. Further, all these techniques will work similarly in many different input devices, another example being a foot-operated computer mouse.

Just as the technique can be applied to orientation-sensitive computer mice, the motion output from a HMD (FIG. 7) can be mapped onto the line seen in FIG. 6. Thus when the user's head turns, the HMD sends rotation information to the computer. When this rotation value, whatever its units, passes the Continuous-motion Zone threshold, presumably near the end of the user's ability to continue to turn, the algorithm will continue to add motion in the given direction. Just as the algorithm automatically centers a mouse on a mouse pad, it will maintain the thresholds in approximately the same region of a user's head rotation. When the thresholds become slightly off, the user will reorient them in the course of rotating through the desired angles, regularly "pulling" the thresholds into the proper positions. When the HMD-view relationship becomes misaligned due to imperfect motion sensors, the present invention offers a user a simple way to readjust the relationship between HMD orientation and presented view without requiring another input device.

As is true with hand or foot rotation, Continuous-motion Zone thresholds for HMD rotation may be set to actuate approximately as the user can no longer rotate the device because of the limits of the user's joints. The resulting sensation of pulling against oneself makes the algorithm's added motion more intuitive for the user. From the user's point of view it seems that the force exerted against the user's own body is actuating the desired continuous input. That is, setting the thresholds in this manner allows a kind of proprioception to occur, simulating familiar relations between motion and feeling. For example, pushing against a weight to move it involves feeling the weight "push back". This principle applies to any direction of head rotation, left-to-right as well as up-and-down.

The new method disclosed herein of controlling an object visible on the display screen has many disparate applications. Computer mice are often used to move cursors from one region to another. Rather than repeatedly move, lift and reposition the mouse as would normally be required for a long transit, the software allows the user to accomplish the transit comfortably by using the Continuous-motion Zone. Similarly, a character or other graphic object may be moved continuously across a scrolling landscape, as in many video games. In applications that simulate three dimensional spaces or entities by presenting the user with a perspective view, the software allows a mouse to be used to move continuously and comfortably through the virtual world without the frustration of repeatedly repositioning the mouse. Similarly, the motion information from an HMD can be interpreted by the software to give Continuous-motion in the virtual world comfortably.

Indeed, the new process can also be used to control any program variable. One could, for example, have the mouse control the current scroll bar position in a scrolling window that is part of a graphical user interface. The user activates both mouse buttons simultaneously, or performs another activation action, and any mouse motion is translated into scroll bar movement in the appropriate direction: no change in the No-Motion zone, proportional change in the Normal zone, and continuous change in the Continuous-Motion Zone. All these applications can be thought of as transits through virtual worlds presented by the computer. Using the new process, objects are moved proportionally to mouse movement while the mouse is in the Normal zone, but in the Continuous-Motion Zone the cursor, on-screen object, or viewpoint moves continuously until the user is in the desired region of the virtual world. If an acceleration curve is specified across the Continuous-motion Zone, the user can initially move far into the Continuous-motion Zone to move very quickly and continuously toward the target region. When the user is near the target region, the user can gradually move toward the Normal zone, slowing the Continuous-motion, until the user has arrived at the desired region and is in the Normal zone. The user is then able to use the Normal zone to act upon the target region with all the speed and precision which make computer mice so desirable. The No-Motion Zone is optional, being quite helpful in preventing unintended actions. A software switch can be employed to allow the user to toggle on/off the No-Motion Zone. The Normal zone can be of arbitrary size. As the Normal zone diminishes toward zero, the input device functions much like a conventional joystick.

The new method disclosed herein of controlling an object visible on the display screen should also work well to help the user use a mouse in lieu of a joystick, affording the advantages of a joystick while providing the precision and speed of a mouse. This has the advantage of freeing users from the physical, cognitive, and playability burdens of picking up their computer mouse repeatedly. In fact, a mouse using the inventive process may be superior to a joystick for games requiring targeting, because of the speed and precision afforded by the Normal zone. The new process can be implemented in mouse hardware, computer hardware, computer mouse driver software, operating system software or in individual applications programs. Moreover, it can be used by an on-line gaming system like AT&T's ImagiNation Network to provide the inventive process functionality from the server software that interprets the user's mouse signals. Thus no special hardware or software is required at the remote user's end at all to enjoy the advantages disclosed herein. This new functionality can be deployed in like fashion on the server systems of all kinds of on-line services. The methodology described herein can be allocated between the local computer and the remote host in various ways within the knowledge of those skilled in the art.

BRIEF DESCRIPTION OF THE DRAWINGS

FIG. 1 is a top plan view illustrating a computer mouse disposed on a mouse pad and delineating by dashed lines various zones of operation according to the present invention.

FIG. 2 illustrates selected aspects of the invention relative to location of the mouse on the mouse pad of FIG. 1 for control of a screen display cursor, object or viewpoint in response to manipulation of the mouse.

FIG. 3 illustrates directions of added cursor motion relative to location of the mouse on the mouse pad of FIG. 1.

FIG. 4a and FIG. 4b together illustrate relocation of the user's "Comfort Frame" relative to the mouse pad of FIG. 1.

DETAILED DESCRIPTION OF A PREFERRED EMBODIMENT

Figure 5:
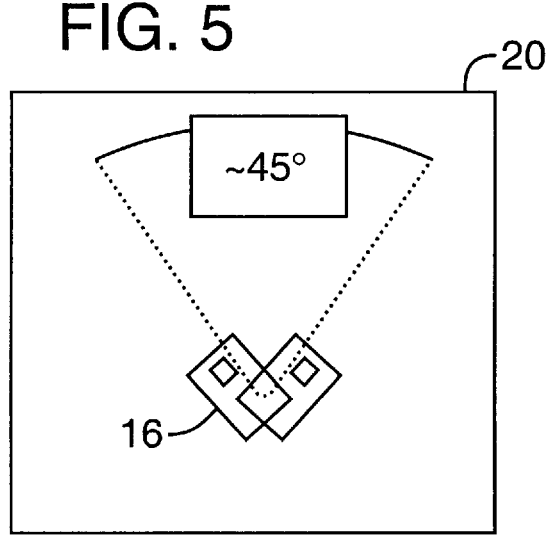
FIG. 5 illustrates rotation of a rotationally-sensitive mouse for controlling rotation of a selected screen display object or a screen display viewpoint.

FIG. 1 is a top plan view illustrating a computer mouse 16 disposed on a mouse pad 20 or other working surface. The mouse 16 itself is conventional and is tethered to a computer system by cable 18 as is known, for conveying mouse displacement signals to the host computer (not shown) as the mouse is moved over the working surface. A conventional mouse is used here for purposes of illustration, but the invention is equally applicable in connection with any motion-indicative computer input device, including for example a trackball or head-mounted display having motion sensors, as further explained later. In the case of the mouse, it provides two orthogonal channels of displacement signals, x and y, corresponding to left-right or transverse movement, and up-down movement, respectively, of the mouse. These directions are indicated in the drawing as arrows "x" and "y". Since these directions are defined by mouse displacement signals, they are relative to the mouse rather than the mouse pad. Diagonal or other "off-axis" movement of the mouse produces both x and y displacement signals as is known.

According to the present invention, we define three different zones of operation of the mouse on the working surface 20. The first zone of operation is a "no-motion zone" 29 delineated by dashed line 30 in FIG. 1. When the mouse is within the no motion zone 29, motion of the mouse is registered by the driver software, but screen display objects are unaffected by this motion. This region is primarily for use in connection with video games, where the user may want a "safety region" where unintended mouse movement does not affect game play. This zone is most useful when the Normal zone is small or non-existent and the mouse is functioning like a joystick.

Surrounding the no-motion zone 29 is a Normal zone 35, bounded by dashed line 36. It should be noted that these zones of mouse operation are represented in the computer in memory and are created and managed by software processes. The zones are not visible on the mouse pad, nor are they displayed on the computer screen during operation. They may be displayed for purposes of setup or calibration. Within the Normal zone 35, mouse movement is handled by the host computer in the way conventional mouse drivers interpret mouse displacement signals. Essentially, the mouse hardware and software periodically update an internal representation of current mouse position. That mouse position is relative to the center of the user's Comfort Frame as further described below.

Surrounding the Normal zone 35 we define a "Continuous-motion zone" 39, delineated by dashed line 40. Dashed line 40 defines the bounds of a user "Comfort Frame". The Comfort Frame is a range of comfortable use for a given user, and the given mouse, over the working surface. This is a range of motion over which the user can comfortably reposition the mouse and use it effectively, without having to lift the mouse up off the working surface. The Continuous-motion zone 39 thus consists of the area outside the Normal zone 35 and still within the Comfort Frame 40. Within the Continuous-motion zone, for example, when the mouse is at location 44 on the working surface, the cursor is continuously repositioned as further described below.

The invention is not limited to cursor control however. The Continuous-motion zone may be used, for example, to continuously reposition any visible object on the computer display screen, such as moving a tank over virtual terrain in a war game or in an actual military training computer simulation environment, or adjust viewpoint in 3-D simulations, adjust program variables like scrolling, or allow continuous rotation in response to a rotation input device such as a HMD.

Figure 6:
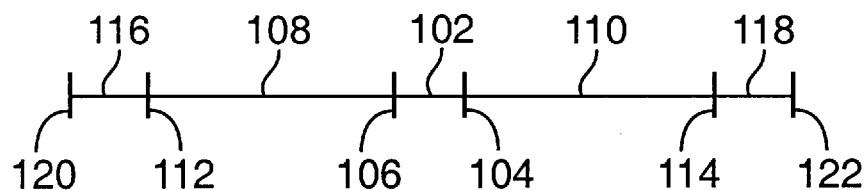
FIG. 6 is a diagram illustrating operation of the present invention with respect to a single dimension of movement of an input device.
Figure 7:
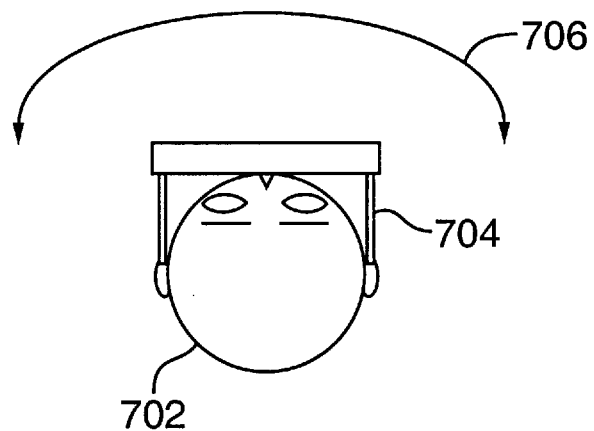
FIG. 7 is a top view of a person wearing a head-mounted display and illustrating rotational movement of the head-mounted display as an example of an input device useful in connection with the present invention.

It is useful to further describe the invention in the context of a single dimension initially. Referring to FIG. 6, line 100 represents a predetermined direction or axis for describing the position of the mouse on the working surface. For this discussion, the mouse is considered as moveable along the axis 100 and, similarly, one may envision movement of a cursor on the display screen along a corresponding horizontal axis. Although the mouse actually moves in two dimensions, each dimension can be interpreted and processed independently. One dimension is described in greater detail.

Adjacent a center of the axis 100 is a linear "no-motion zone" 102, delimited by a pair of no-motion zone threshold locations 104, 106. Surrounding the no-motion zone 102 is a Normal zone 108, 110 delimited by Normal zone threshold locations 112, 114, respectively. Surrounding the Normal zone 108, 110 is a continuous-motion zone illustrated by regions 116, 118, which in turn are delimited by Comfort Frame threshold locations 120, 122, respectively. According to the present invention, in this unidimensional illustration, a cursor or other screen display object is maintained in its present position as long as the mouse position is within the no-motion zone 102. If and when the current mouse position exceeds the dead zone, by crossing over a threshold 104 or 106, the cursor will be repositioned in direct proportion to the mouse repositioning, and along the screen display axis corresponding to the axis 100. Thus, if the mouse moves to the right into Normal zone 110, the cursor also would move to the right along the corresponding axis on the screen display.

It should be noted, however, that the axis 100 used here to illustrate mouse repositioning may be mapped to a different direction on the screen display, or even to a different variable other than cursor position. For example, this axis 100 of mouse location could be mapped to an angle of rotation of an object displayed on the screen, or rotation of a 3-D viewpoint. However applied, the mapping is a linear, spatial mapping within the Normal zone. Accordingly, the amount of cursor repositioning or angular rotation will vary in proportion to the mouse position within the Normal zone on the axis 100. FIG. 5 illustrates rotational motion of a mouse on a mouse pad. A given range of rotation, e.g. 45 degrees, may be the range of comfortable rotation for a given user, and the given mouse, over the working surface. This is a range over which the user can comfortably rotate the mouse without having to lift the mouse up off the working surface. The angle of rotation can be considered a dimension. A no-motion zone, Normal zone and continuous-motion zone can be defined with respect to rotation just as with respect to linear motion as in FIG. 6. These may be called "no-rotation zone", "Normal zone" and "continuous-rotation zone," respectively, to more clearly describe the intended operation. In use, the user need only rotate the input device into the continuous-rotation zone, say 30 degrees off center, and the corresponding (or selected) screen display object (or 3-D viewpoint) will rotate continuously until the user rotates the mouse back into the Normal zone. The screen display object need not necessarily actually "rotate". Rotation can be mapped into any control or variable, e.g. color, audio volume, etc.

If and when the input device moves beyond either of the continuous-motion zone threshold locations 112, 114 it enters the corresponding continuous-motion zone 116 or 118. In this case, the invention calls for repeatedly repositioning the cursor in the direction corresponding to axis 100, even without further movement of the mouse. In one embodiment, the cursor is repeatedly repositioned by a constant, predetermined increment, thereby imparting a substantially constant velocity to the cursor in the direction on the screen that corresponds to axis 100, as long as the input device remains in a given position in the acceleration zone. As a result, the cursor is repositioned as if the user had actuated a joystick or similar device arranged for moving the cursor in a constant speed and direction. If and when the input device is moved back into the Normal zone, the added motion is no longer added and the cursor moves in response to further movement of the mouse as before.

FIG. 2 illustrates the foregoing principles as implemented in two dimensions. To do so, each channel of mouse displacement signals, x and y, is monitored and compared to predetermined zone thresholds as described with reference to FIG. 6. The threshold values for the x and y channels need not be the same. If they are the same, the various zones of operation will be substantially square, as illustrated in FIG. 2. Differing the threshold locations for two dimensions will result in a rectangular zone.

In FIG. 2, four different mouse locations are illustrated by "X"3 s. At location 202, which is within the no-motion zone, the cursor remains stationary. At mouse location 204, within the Normal zone, the cursor is repositioned in response to mouse repositioning in the conventional manner. At location 206, the mouse is slightly within the Continuous-motion zone, and accordingly the software adds a slow, steady motion to the right, i.e., in a direction defined by the mouse location relative to the center of the mouse pad or working surface.

Another aspect of the invention is to control the cursor speed while the mouse is in the Continuous-motion zone, in dependence upon the mouse location. Accordingly, in one embodiment, the invention calls for selecting a position increment and then repeatedly repositioning the cursor by a the selected position increment, thereby imparting an apparent velocity to the cursor that is proportional to the selected position increment. Simply put, selecting a larger increment makes the cursor go faster (since the update frequency is constant). The position increment can be selected as any function of the distance or "depth" of the mouse location into the Continuous-motion zone. In other words, the position increment can be a function of the distance by which the updated current mouse position exceeds the Continuous-motion zone threshold. Thus, in FIG. 2, with the mouse at location 208, the cursor is moved at a velocity greater than that resulting from the mouse at position 206. Yet another embodiment calls for selecting the position increment from among a plurality of predetermined discrete position increments as a function of the depth into the Continuous-motion zone. The predetermined position increments can be stored in a lookup table. The relationship between mouse location and position increment (hence cursor velocity) can be called an acceleration curve.

TABLE 1

Method A

| Distance into Continuous Motion Zone (in Mickeys) | | | | | |
|---|---|---|---|---|---|
| | 30 | 60 | 90 | 120 | 150 |
| CMZ factor | .05 | .1 | .16 | .2 | .25 |

TABLE 1

Method B

| Mickeys past joystick threshold | Add Position Increment |
|---|---|
| 30 | 15 |
| 60 | 30 |
| 90 | 45 |
| 120 | 60 |
| 150 | 75 |

The added cursor motion is a vector quantity, consisting of speed and direction. Various way to control cursor speed were just described. The direction of cursor motion applied in the Continuous-motion zone may be controlled in various ways described next. FIG. 3 is another top plan view illustrating various mouse locations on a work surface. The center of the Comfort Frame 40 is indicated at 38. And the Normal zone lies within dashed line 36 as before. The figure shows several examples of cursor direction along an imaginary line between the Comfort Frame center 38 and the current mouse position. For example, current mouse position 302 results in a cursor direction indicated by vector 304. The cursor moves to the left since the mouse position is to the left of center. Similarly, mouse position 306 results in a cursor vector 308 in a generally downward direction. Mouse position 310 results in a diagonal cursor vector 312.

Figure 8:
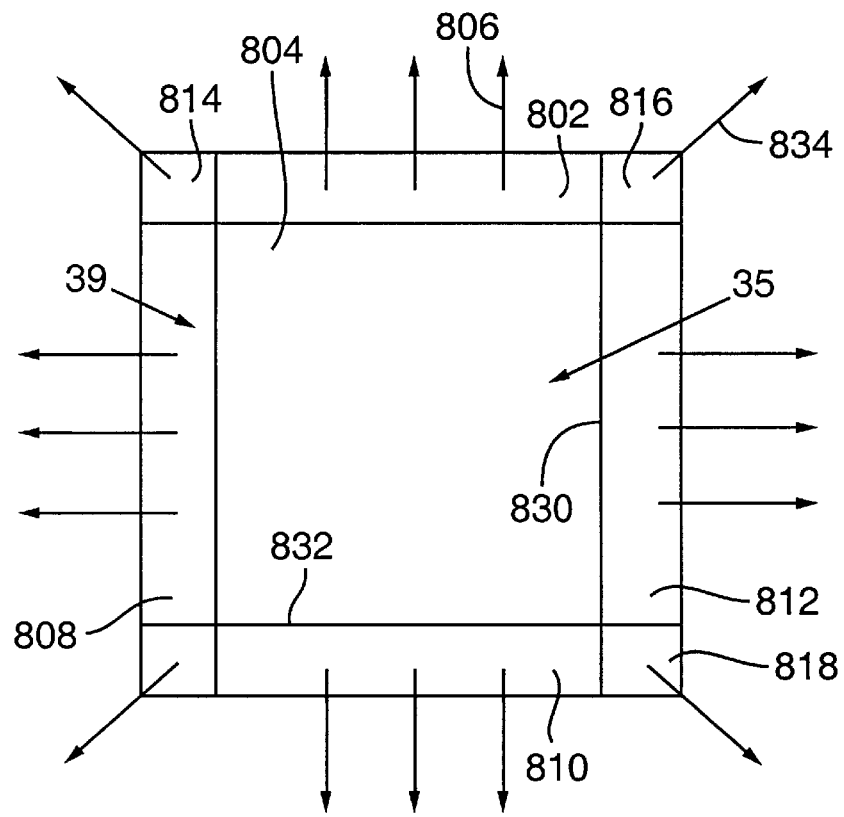
FIG. 8 is another top plan view of a mouse pad or other working surface illustrating orthogonal operation of the present invention for control of a screen display cursor, object or viewpoint in response to manipulation of an input device.

An alternative process for controlling cursor direction is illustrated in FIG. 8. In FIG. 8, consider the shaded rectangular area 802. Area 802 is within the Continuous-motion zone, because it is outside of the threshold 804. According to one embodiment, if the mouse position lies anywhere within area 802, the vector of Continuous-motion is strictly vertical, as indicated by vector 806, even though a line between the center of the Comfort Frame and the actual mouse position may not be parallel to the vertical axis.

Similarly, if the mouse is positioned anywhere within any of Continuous-motion zones 808, 810 or 812, the cursor motion is added in a direction (left, down or right, respectively) along the corresponding orthogonal axis. If the mouse is located in any one of the "corner zones" 814, 816, 818, 820, then the direction of Continuous-motion is in the corresponding diagonal direction, i.e., at 45 degrees angle relative to the Comfort Frame. Note that this diagonal direction of cursor motion will result "automatically" from independently processing each dimension of mouse motion as described above. For example, refer to corner zone 816. Since the mouse is outside the horizontal threshold 830, Continuous-motion is added to the cursor in a horizontal (in this case to the right) direction. The mouse is also outside the vertical threshold 804, so upward motion is added to the cursor. The sum of the upward and right motion results in the diagonal motion indicated by vector 834. We call this orthogonal motion (on-axis or diagonal), as distinguished from vector motion, described next. Orthogonal motion works well for many programs other than video games because it makes it easy for the user to indicate pure orthogonal and diagonal directions. This capacity is useful for scrolling an on-screen window, moving objects, or rotating a part in a CAD program.

Figure 9:
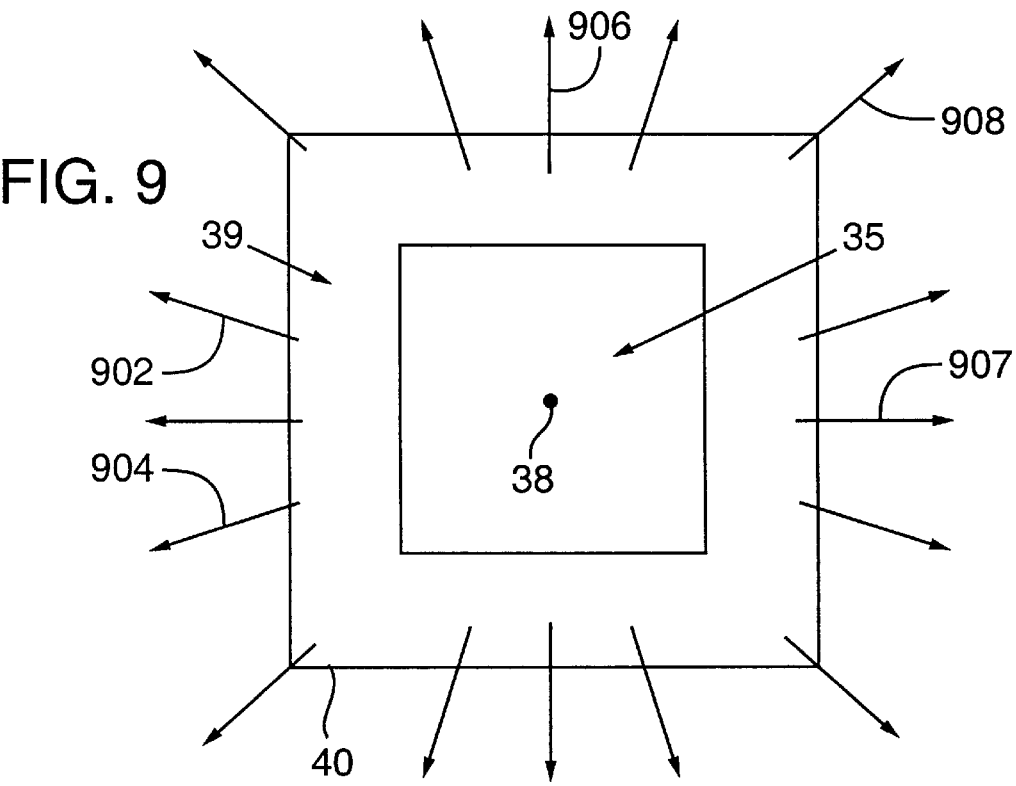
FIG. 9 is another top plan view of a mouse pad or other working surface illustrating vector operation of the present invention for control of a screen display cursor, object or viewpoint in response to manipulation of an input device.

FIG. 9 illustrates vector motion of the cursor (or other screen display object). Here, when the mouse is within the continuous-motion zone 39, the cursor is moved in a direction defined by an imaginary line between the center 38 of the Comfort Frame 40 and the current mouse location. These vector directions are illustrated by the various arrows (vectors) shown in the drawing. For each vector, the mouse location (not shown) is implied at the "tail" end of the vector. Examples include vectors 902, 904 which are off (i.e. angularly offset from) the orthogonal axes. If and when the mouse happens to lie exactly vertically or horizontally offset from center, the resulting vector direction (and hence cursor direction) will be vertical or horizontal, as the case may be, as shown by vectors 906, 907 respectively. Similarly, when the mouse happens to be diagonally offset from center, a diagonal vector results 908. In all cases the exact cursor direction of Continuous-motion will be defined by the stored representation of the current mouse position. And the speed or position increment also will depend upon the stored representation of the current mouse position.

The calculation for determining the motion to be added may be implemented in many ways. One simple way is to multiply the greatest Continuous-motion Zone factor of the dimensions involved by the value of each dimension, then add the result to each respective dimension (using Table 1, Method A). Another approach is to add absolute amounts of motion as in Table 1, Method B. Many other approaches will be obvious to one skilled in basic mathematics and computer programming, with the best approach being dependent on the dimensions involved and the goals of the specific application.

Figure 10:
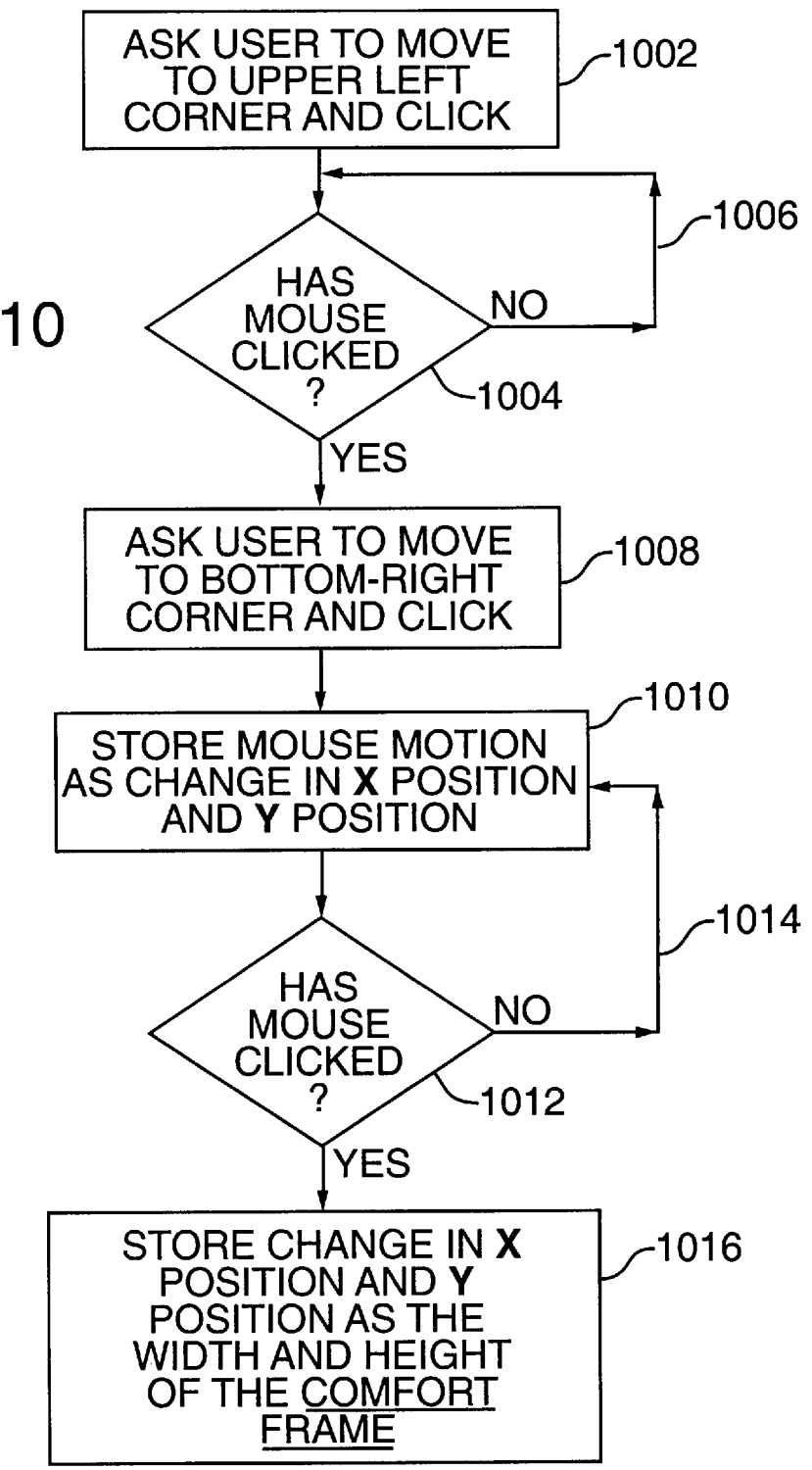
FIG. 10 is a flow chart illustrating a setup process for establishing the size of a user's Comfort Frame.

FIG. 10 is a flowchart illustrating a calibration process for determining the user's Comfort Frame. This interactive process uses screen displays to instruct the user as follows. First, the user is asked to move the mouse or other pointing device to the upper left limit of the user's range of comfortable motion, and click the mouse, step 1002. Decision 1004 and loop 1006 wait until the mouse is clicked. Next, the user is asked in step 1008 to move the mouse to the bottom right limitation of the comfort zone. Step 1010 calls for storing the mouse motion (received as displacement signals) as changes in x position and y position. Referring to decision 1012 and loop 1014, the process continues to store x and y position changes until the mouse is clicked. Thereafter, in step 1016, the change in x position and y position are stored in memory as the width and height of the Comfort Frame, respectively. This stores the "dimensions" of the Comfort Frame, but not any absolute location. The Comfort Frame is subject to repositioning as will be described. As an alternative to this custom setup procedure, a default Comfort Frame can be assumed. For example, a typical mouse provides displacement signals, called Mickeys, at a resolution of 300 Mickeys per inch of travel. A useful default Comfort Frame may be +/–600 Mickeys. In other words, a total of 1200 Mickeys in x and y directions, corresponding to a four-inch square on the mouse pad. Further, orientationally-sensitive mice may be set similarly by having the user rotate the mouse through a comfortable rotational range, and an HMD may be set by having the user turn their head through a comfortable range.

Once the dimensions of the Comfort Frame are established by default or custom setup, it remains to setup the various zone threshold values. Initially we determine the center of the Comfort Frame. A No-Motion Zone (which again is optional), can be established by default or by custom input. For example, it may be selected from a control panel (screen display). A useful default value for the No-Motion Zone may be, e.g. +/–40 or 50 Mickeys, for example. Recall that each dimension can be established independently, so even the No-Motion Zone need not necessarily be square. Alternatively, appropriate No-Motion Zones can be selected in dependence upon the application software to be used, for example using a lookup table, or selected by the application software itself. The No-Motion Zone preferably is assumed to be symmetrical about the center of the Comfort Frame.

Figure 13:
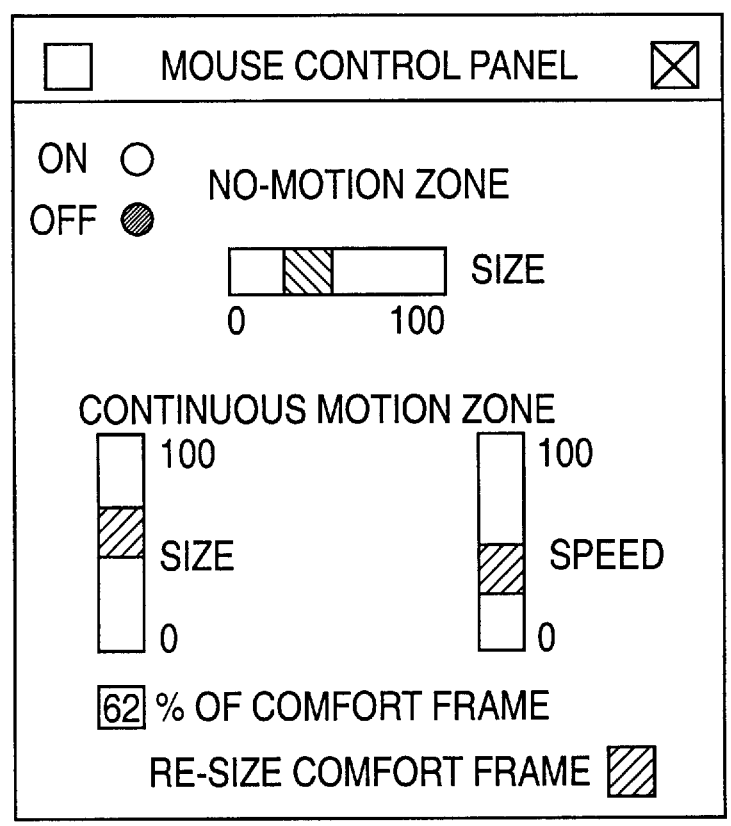
FIG. 13 is an example of a control panel for setting user preferences.

Next we establish the Normal zone threshold values. Again, this can be done by default or by user preference. A useful default value for the Normal zone threshold values may be, e.g. +/–450 Mickeys about the center of the Comfort Frame. The Continuous-Motion Zone by definition is the remaining area outside the Normal zone threshold and within the Comfort Frame, i.e. in our preferred example +/–450 to +/–600 Mickeys about center. In a preferred embodiment for cursor control in a 2-D application, the continuous-motion zone is selected in a control panel as a percentage, say within a range of 5–30 percent, of the Comfort Frame. So, in the example of the Comfort Frame spanning +/–600 Mickeys, the continuous-motion zone would comprise the outer 30–180 Mickeys. In other applications, for example video games, the ideal range may be anywhere from 0 to 100 percent. An example of a control panel is shown in FIG. 13.

Figure 11:
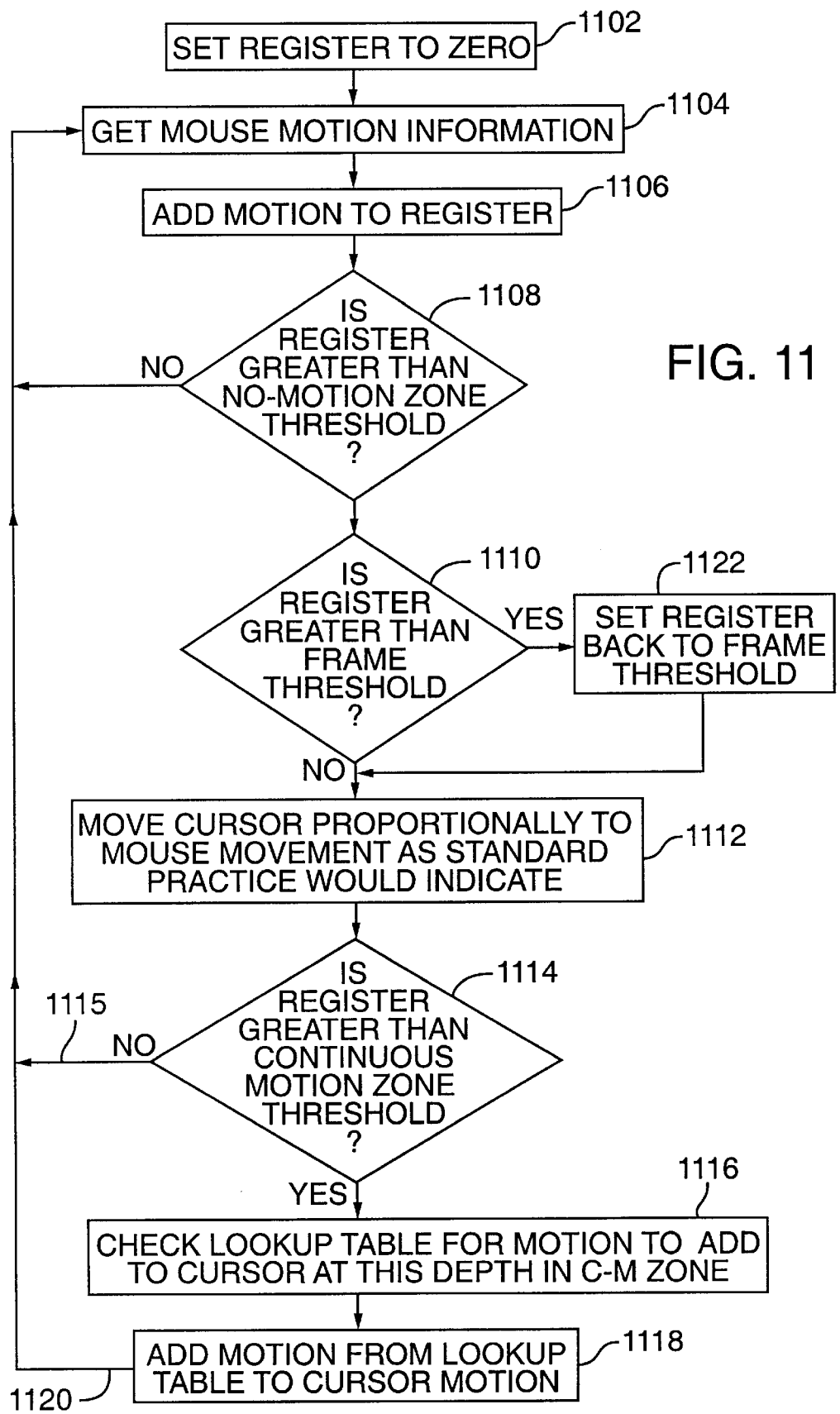
FIG. 11 is a flow chart illustrating a process of controlling a screen display object, cursor or viewpoint according to one illustrative embodiment of the invention.

FIG. 11 is a flowchart illustrating the control process of the present invention in the context of a single dimension. A selected register or memory location is initialized to zero, step 1102. The register is used to hold an internal representation of a current mouse position. It is assumed that the mouse is initially at the center of the comfort zone, hence position =0 (speaking with respect to but a single dimension). A keyboard key, or control-key chord can be used to for centering the comfort zone. The user simply places the mouse at the center of her comfort zone, and presses this predetermined key. The software clears the mouse position register to 0. Thus, the mouse is at center by definition. Mouse position is tracked from there, as described next.

Step 1104 is to acquire mouse motion information, i.e., receive displacement signals from the mouse which results from physical movement of the mouse. This information is used to update the register, step 1106. Step 1108 compares the updated mouse position to a predetermined no motion zone threshold. If the updated current mouse position exceeds the no motion zone threshold, step 1110 tests whether the current updated mouse position exceeds the Comfort Frame threshold. If it does not, the cursor is moved, step 1112, in proportion to the mouse movement as the mouse is apparently within the Normal zone. If test 1110 determines that the updated mouse position is beyond the Comfort Frame, step 1122 next resets the mouse position register back to the Comfort Frame value. This step has the effect of repositioning or "dragging" the Comfort Frame, because the updated mouse position has been reduced by the amount by which it exceeded the previous Comfort Frame. To illustrate, assume the Comfort Frame size is +/–600 Mickeys (only one dimension is necessary to illustrate the process). If and when the mouse moves, say 700 Mickeys to the right, then step 1122 resets the updated mouse position value back to 600. The frame size remains constant. So, when the mouse moves back to left 600 Mickeys, the updated position value is now zero. Thus, the mouse is at the center of the Comfort Frame. But it only came back 600M whereas it had been 700M to the right of the previous center. In effect, the Comfort Frame moved 100M to the right. It was dragged along with the mouse. After this resetting step 1122, control returns to step 1112 as above, for repositioning the cursor in response to the mouse movement—even if the mouse exceeds the comfort zone.

Step 1114 next compares the current updated mouse position to the Continuous-motion zone threshold. If the updated mouse position is not outside the Continuous-motion zone threshold, the process proceeds via path 1116 back to step 1104 to again receive mouse displacement signals. This loop continues so that the representation of the current mouse position is updated periodically in response to the displacement signals, and the cursor is repositioned periodically as well.

Referring again to test 1114, if the mouse position is greater than the Continuous-motion zone threshold, step 1116 calls for selecting a position increment for moving the cursor. This may be implemented, for example, by employing a lookup table for selecting a position increment as a function of "depth" into the Continuous-motion zone, as noted previously. See Table 1 below. Step 1118 next calls for repositioning the cursor by the selected position increment. The process continues via path 1120 back to step 1104 to again receive mouse displacement signals. It may be observed here that if the mouse does not move from its present location (within the Continuous-motion zone), the process will "fall through" steps 1106, 1108, 1110, 1112, 1114, 1116 and further reposition the cursor by the selected increments. This process continues so that the cursor is repositioned periodically at a predetermined frequency, for example 20 Hz, thereby imparting an apparently constant velocity to the cursor motion across the display screen.

Repositioning the Comfort Frame is illustrated in FIG. 4. FIG. 4 shows, on the left side, a Comfort Frame 40 that is substantially centered on the mouse pad 20. The Normal zone threshold is indicated by dashed line 36 as before. On the right side of FIG. 4, the Comfort Frame has drifted to a new location 400. The no motion zone, Normal zone and Continuous-motion zone move together with the Comfort Frame, as illustrated in FIG. 4. This is because, as explained above, the various zones are defined relative to the Comfort Frame. Eventually, the user is likely to use the Continuous-motion feature in the downward or left direction. The user will naturally move the mouse to the extreme of their frame of comfortable use in that direction, which will be beyond the "drifted" Comfort Frame 400 of FIG. 4B. In response, the system will "drag" the Comfort Frame back towards the centered position of FIG. 4A, as explained above with reference to the flowchart of FIG. 11. Re-centering generally will keep the Comfort Frame centered about the user's center of comfortable physical motion. Thus, in practice, the user will be continually re-centering the Comfort Frame 40 on the working surface 20 in the course of normal use. Optionally, a keypress can be used to automatically re-center the Comfort Frame around the mouse's current position at any time. The selected key simply resets the mouse position register(s) to zero.

Figure 12:
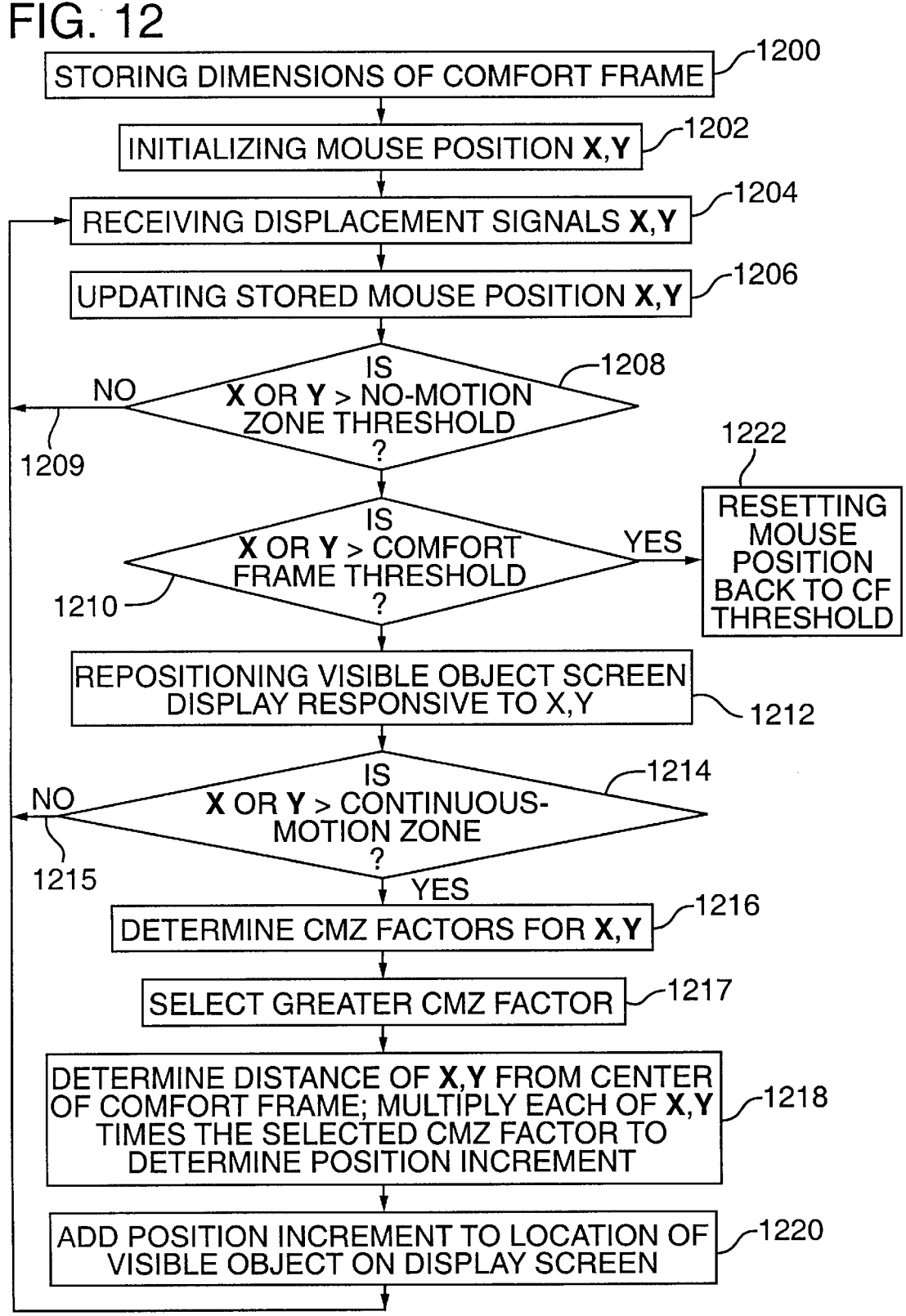
FIG. 12 is a flow chart illustrating a process of controlling a screen display object, cursor or viewpoint according to another illustrative embodiment of the invention.

FIG. 12 is a flowchart illustrating a two-dimensional process with vector added motion as follows. The first step is to establish the size of the Comfort Frame, step 1200. Next, step 1202, is to initialize a pair of registers or memory locations x,y to zero. These memory locations will maintain a representation in the computer of a current mouse position. The next step is to monitor displacement signals received from the mouse in response to physical movement of the mouse, step 1204. Specifically, in the two-dimensional example, the mouse provides two separate channels of displacement signals, x and y. In step 1206, the displacement signals are used to update the internal representation of current mouse position. The x displacement signals update the x register and the y displacement signals are added to the y register.

The process next calls for comparing the updated mouse position to the No-motion zone threshold, step 1208. More specifically, each of the x and y mouse position values are compared to the respective x and y No-motion zone threshold values, which were previously established as described. If neither the x or y values exceeds the corresponding threshold value, then control returns via path 1209 to check again for displacement signals in step 1204. The loop formed by 1204, 1206, 1208 and 1209 continues so as to monitor displacement signals until the updated mouse position exceeds the No-motion zone threshold. Once the updated mouse position exceeds the No-motion zone threshold in either dimension, test 1210 compares the updated mouse position to the Comfort Frame threshold value. Specifically, each of the x and y mouse position values are compared to the corresponding Comfort Frame threshold values. If the threshold value is exceeded in either or both dimension, the process next calls for resetting the corresponding register(s) back to the corresponding Comfort Frame threshold value, step 1222. In other words, if the current updated mouse position exceeds the Comfort Frame threshold value in either or both dimensions, the stored representation of the mouse position x,y is held to the Comfort Frame threshold value.

The process in either case proceeds to step 1212 to updating the cursor position on the display screen according to the updated mouse position. In this regard, the mouse acts like a conventional mouse, because it is within the Normal zone of operation. Step 1214 determines whether the updated mouse position exceeds the Continuous-motion zone threshold in either dimension. If not, control proceeds via path 1216 back to step 1204. If so, the process calls for determining a position increment for adding motion to the display object. One example of a method of selecting the position increment is as follows. Step 1216 calls for selecting a continuous-motion zone (CMZ) factor, which may be done by a look-up table or mathematical calculation, as a function of the current x and y values. Examples are shown in Table 1. Step 1217 selects the larger of these factors. Step 1218 comprises, for each dimension, multiplying the selected CMZ factor by the corresponding distance (x or y) from the center of the Comfort Frame to determine a position increment. In step 1220, this position increment is added to reposition (or rotate) the visible object on the display screen. Note that this process is a vector approach as opposed to the orthogonal approach, thus resulting in added motion as illustrated in FIG. 9 rather than that of FIG. 8.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

I claim:

1. In a computer system having a display screen and a mouse, a method of controlling an object visible on the display screen responsive to physical manipulation of the mouse, comprising:

initializing a representation in the computer of a current mouse position;

receiving displacement signals from the mouse in response to physical movement of the mouse;

updating the representation of the current mouse position in response to the received displacement signals;

repositioning the visible object on the screen display according to the updated mouse position;

comparing the updated mouse position to a predetermined Continuous-motion zone threshold value;

if the updated current mouse position exceeds the Continuous-motion zone threshold value, further repositioning the visible object on the screen display by a position increment;

periodically repeating said receiving, updating, repositioning, comparing and further repositioning steps so as to move the visible object on the display screen both in response to physical movement of the mouse and so as to add substantially continuous additional motion to the visible object as long as the updated mouse position exceeds the Continuous-motion zone threshold, the speed of said added motion being proportional to the position increment;

the representation in the computer of the current mouse position including indications of mouse position with respect to two dimensions;

said receiving step including receiving a pair of mouse displacement signals, each mouse displacement signal indicative of physical mouse movement in a corresponding one of said two dimensions;

said updating step including updating the indications of current mouse position with respect to each of said two dimensions in response to the corresponding received displacement signal;

said comparing step including comparing the updated mouse position to a pair of predetermined Continuous-motion zone threshold values, each of the Continuous-motion zone threshold values corresponding to a respective one of said two dimensions;

said further repositioning step including further repositioning the visible object on the screen display by a first selected position increment in a first one of said two dimensions if the updated current mouse position exceeds the corresponding Continuous-motion zone threshold value; and further repositioning the visible object on the screen display by a second selected position increment in the other one of said two dimensions if the updated current mouse position exceeds the corresponding Continuous-motion zone threshold value, thereby adding substantially continuous additional motion to the visible object in either or both of said two dimensions as long as the updated mouse position exceeds the corresponding Continuous-motion zone threshold value.

2. A method according to claim 1 therein the position increment is selected from within a range of approximately 10 to 100 Mickeys.

3. In a computer system having a display screen and a mouse, a method of controlling an object visible on the display screen responsive to physical manipulation of the mouse, comprising:

initializing a representation in the computer of a current mouse position;

receiving displacement signals from the mouse in response to physical movement of the mouse;

updating the representation of the current mouse position in response to the received displacement signals;

repositioning the visible object on the screen display according to the updated mouse position;

comparing the updated mouse position to a predetermined Continuous-motion zone threshold value;

if the updated current mouse position exceeds the Continuous-motion zone threshold value, further repositioning the visible object on the screen display by a position increment;

periodically repeating said receiving, updating, repositioning, comparing and further repositioning steps so as to move the visible object on the display screen both in response to physical movement of the mouse and so as to add substantially continuous additional motion to the visible object as long as the updated mouse position exceeds the Continuous-motion zone threshold, the speed of said added motion being proportional to the position increment; and comparing the updated mouse position to a predetermined No-motion zone threshold value defining a no-motion zone of mouse operation, and maintaining the visible object in its current location on the display screen as long as the updated current mouse position remains within the No-motion zone.

4. A method according to claim 3 further comprising receiving an indication for selectively enabling the no-motion zone and executing the said step of maintaining the visible object in its current location on the display screen only if the no-motion zone is enabled.

5. A method according to claim 4 wherein said indication for selectively enabling the no-motion zone is received from the computer keyboard.

6. A method according to claim 4 wherein said indication for selectively enabling the no-motion zone is received from an application program.

7. In a computer system having a display screen and a mouse, a method of controlling an object visible on the display screen responsive to physical manipulation of the mouse over a two-dimensional working surface, comprising:

storing dimensions of a two-dimensional Comfort Frame of operation of the mouse in a memory in the computer;

initializing a two-dimensional representation of current mouse position in a memory in the computer, each dimension of current mouse position corresponding to a respective one of the two dimensions of the Comfort Frame;

receiving displacement signals from the mouse in response to physical movement of the mouse over the working surface in each of said two dimensions;

periodically updating the representation of the current mouse position in response to the received displacement signals;

periodically repositioning the visible object on the screen display according to the updated mouse position;

comparing the updated mouse position to predetermined Continuous-motion zone threshold values in each of said two-dimensions, the Continuous-motion zone threshold values defining a continuous-motion zone within the Comfort Frame; and further repositioning the visible object if the updated mouse position exceeds the predetermined Continuous-motion zone threshold values in either or both of said two-dimensions.

8. A method according to claim 7 further comprising:

if the updated current mouse position exceeds the Continuous-motion zone threshold in a first one of said dimensions, further repositioning the visible object on the display screen in a first direction corresponding to said first dimension;

if the updated current mouse position exceeds the Continuous-motion zone threshold in the other dimension, further repositioning the visible object on the display screen in a second direction corresponding to the said other dimension, thereby adding orthogonal motion to the visible object along one or both of said two dimensions; and periodically repeating said receiving, updating, repositioning, comparing and further repositioning steps so as to move the visible object on the display screen both in response to physical movement of the mouse and so as to add substantially continuous additional motion to the visible object as long as the updated mouse position exceeds the corresponding Continuous-motion zone threshold value in either or both of said dimensions.

9. A method according to claim 7 further comprising:

further repositioning the visible object on the screen display by a first selected position increment in a first one of said two dimensions if the updated current mouse position exceeds the corresponding Continuous-motion zone threshold value; and further repositioning the visible object on the screen display by a second selected position increment in the other one of said two dimensions if the updated current mouse position exceeds the corresponding Continuous-motion zone threshold value, thereby adding substantially continuous additional motion to the visible object in either or both of said two dimensions as long as the updated mouse position exceeds the corresponding Continuous-motion zone threshold value.

10. A method according to claim 7 further comprising selecting the first and second increments as predetermined functions of a respective distance by which the updated current mouse position exceeds the corresponding Continuous-motion zone threshold value.

11. A method according to claim 7 further comprising:

determining a center of the Comfort Frame;

comparing the updated current mouse position to the center of the Comfort Frame to define a vector direction therebetween; and wherein said step of further repositioning the visible object includes adding motion to the visible object in a direction corresponding to the vector direction defined by the mouse and the Comfort Frame.

12. A method according to claim 11 wherein said adding motion to the visible object includes adding motion having a speed proportional to a depth of the current mouse position into the continuous-motion zone.

13. A method according to claim 7 wherein said storing the dimensions of the Comfort Frame includes receiving said dimensions through an interactive setup procedure.

14. A method according to claim 7 including establishing said dimensions of the Comfort Frame as a default value of approximately +/−600 Mickeys.

15. A method according to claim including determining the continuous-motion zone threshold values through a control panel as a user-selected portion of the Comfort Frame dimensions.

16. A method according to claim 15 wherein the continuous-motion zone threshold values are selected within a range of 0 to 100 percent of the user's Comfort Frame.

17. In a computer system having a display screen and a mouse, a method of controlling a scroll bar in a scrolling window on the display screen responsive to physical manipulation of the mouse, comprising:

initializing a representation in the computer of a current scroll bar position;

receiving displacement signals from the mouse in response to physical movement of the mouse;

updating the representation of the current mouse position in response to the received displacement signals;

repositioning the scroll bar according to the updated mouse position;

comparing the updated mouse position to a predetermined Continuous-motion zone threshold value;

if the updated current mouse position exceeds the Continuous-motion zone threshold value, further repositioning the scroll bar by a predetermined scroll increment; and periodically repeating said receiving, updating, repositioning, comparing and further repositioning steps so as to move the scroll bar on the display screen both in response to physical movement of the mouse and so as to add substantially continuous additional motion to the scroll bar as long as the updated mouse position exceeds the Continuous-motion zone threshold, the speed of said added motion being proportional to the scroll increment.

18. A method according to claim 17 and further comprising the steps of:

defining an acceleration function; and adjusting the scroll increment in response to the updated mouse position according to the acceleration function while the updated mouse position exceeds the Continuous-motion zone threshold value, thereby accelerating scrolling the window in response to movement of the mouse.

* * * * *